US012711001B2

(12) United States Patent
Zhang et al.

(10) Patent No.: US 12,711,001 B2
(45) Date of Patent: Aug. 18, 2026

(54) METHOD AND SYSTEM FOR ADAPTIVE EVENT FORWARDING

(71) Applicant: Lenovo (Beijing) Limited, Beijing (CN)

(72) Inventors: Caihong Zhang, Shanghai (CN); Fred Allison Bower, III, Durham, NC (US); Jeffery Van Heuklon, Rochester, MN (US)

(73) Assignee: LENOVO (BEIJING) LIMITED, Beijing (CN)

( * ) Notice: Subject to any disclaimer, the term of this patent is extended or adjusted under 35 U.S.C. 154(b) by 506 days.

(21) Appl. No.: 18/347,194

(22) Filed: Jul. 5, 2023

(65) Prior Publication Data

US 2024/0311213 A1 Sep. 19, 2024

(30) Foreign Application Priority Data

Mar. 14, 2023 (CN) ........................ 202310265647.6

(51) Int. Cl.
*G06F 9/54* (2006.01)

(52) U.S. Cl.
CPC .................................. *G06F 9/542* (2013.01)

(58) Field of Classification Search
CPC ...................................................... G06F 9/545
USPC ........................................................ 719/318
See application file for complete search history.

(56) References Cited

U.S. PATENT DOCUMENTS 7,124,170 B1 * 10/2006 Sibert .................... G06F 21/71 709/216
2011/0252433 A1 * 10/2011 Isoyama ................ G06F 9/542 719/318
2012/0124594 A1 * 5/2012 Mikami ................. G06F 9/542 719/318

* cited by examiner

*Primary Examiner* — Charlie Sun
(74) *Attorney, Agent, or Firm* — ANOVA LAW GROUP, PLLC

(57) ABSTRACT

The present disclosure describes a method for adaptive event forwarding. The method includes receiving a plurality of predefined event subscription rules associated with one or more event subscribers, detecting a system and facility event associated with a system and facility operation of a computing system, determining context of the system and facility operation associated with the detected system and facility event, and determining whether to forward the detected system and facility event to an event subscriber based on the context of the system and facility operation and the plurality of predefined event subscription rules.

16 Claims, 5 Drawing Sheets

METHOD AND SYSTEM FOR ADAPTIVE EVENT FORWARDING

CROSS-REFERENCE TO RELATED APPLICATION E

This application claims priority to Chinese Application No. 202310265647.6, filed on Mar. 14, 2023, the entire content of which is incorporated herein by reference.

FIELD OF THE DISCLOSURE

The present disclosure generally relates to the field of system administration and, more particularly, relates to methods, systems, and computer program products for adaptive event forwarding.

BACKGROUND

In current system administration, different administrators may have different roles and responsibilities in managing a large infrastructure (e.g., a data center). To facilitate close attention and addressing certain problems that occur in a system, current system administration tools may configure a set of different event subscription rules for administrators with different roles, to allow certain system and facility operation-related events (e.g., alerts or warnings) to be forwarded to respective administrators for immediate or close attention. These event subscription rules are generally static and not flexible after configuration, and thus may not reflect the dynamic interest change of certain administrators. To change these static event subscription rules, it requires manual modification of existing event subscription rules stored in a system, which is time-consuming and not convenient.

In addition, under certain circumstances, a system administrator may care about certain administration-related events only for a short period of time. For instance, when a system administrator is servicing a specific computing element for a short period of time (e.g., 30 minutes), he may want more information about that specific computing element only at that specific servicing time. Current static event subscription rules do not really have a time-based component to "turn on" or "turn off" certain event subscription rules for a specific computing element a short period of time.

Therefore, there is a need to provide a new technical solution to improve at least one of the technical problems in the current system administration.

BRIEF SUMMARY OF THE DISCLOSURE

According to one aspect of the present disclosure, an adaptive event forwarding method is provided. The method includes receiving a plurality of predefined event subscription rules associated with one or more event subscribers; detecting a system and facility event associated with a system and facility operation of a computing system; determining context of the system and facility operation associated with the detected system and facility event; and determining whether to forward the detected system and facility event to an event subscriber based on the context of the system and facility operation and the plurality of predefined event subscription rules.

According to another aspect of the present disclosure, a computer program product for adaptive event forwarding is provided. The computer program product comprises a non-volatile computer readable storage medium and program instructions stored therein, where the program instructions are configured to be executable by a computer to cause the computer to perform operations comprising: receiving a plurality of predefined event subscription rules associated with one or more event subscribers; detecting a system and facility event associated with a system and facility operation of a computing system; determining context of the system and facility operation associated with the detected system and facility event; and determining whether to forward the detected system and facility event to an event subscriber based on the context of the system and facility operation and the plurality of predefined event subscription rules.

According to yet another aspect of the present disclosure, an adaptive event forwarding system is provided. The system comprises a processor and a non-volatile memory containing computer program instructions that are configured to be executed by the processor to perform operations comprising: receiving a plurality of predefined event subscription rules associated with one or more event subscribers; detecting a system and facility event associated with a system and facility operation of a computing system; determining context of the system and facility operation associated with the detected system and facility event; and determining whether to forward the detected system and facility event to an event subscriber based on the context of the system and facility operation and the plurality of predefined event subscription rules.

Other aspects of the present disclosure can be understood by those skilled in the art in light of the description, the claims, and the drawings of the present disclosure.

BRIEF DESCRIPTION OF THE DRAWINGS

The accompanying drawings, which are incorporated in and constitute a part of the specification, illustrate various embodiments of the present disclosure and, together with the description, serve to explain the principles of the present disclosure.

DETAILED DESCRIPTION

Various exemplary embodiments of the present disclosure will now be described in detail with reference to the accompanying drawings. It is to be noted that the relative arrangement of the components and the steps, numerical expressions, and numerical values set forth in these embodiments do not limit the scope of the present disclosure unless it is specifically stated otherwise.

The following description of at least one exemplary embodiment is merely illustrative in nature and, by no means, is to be construed as any limitation on the present disclosure and its application or use. Techniques, methods, and devices known to those of ordinary skill in the relevant art may not be discussed in detail but, where appropriate, the techniques, methods, and devices should be considered as a part of the description.

It should be noted that the same reference numbers and letters designate the same or similar parts in the following drawings. Therefore, once a part is defined in a drawing, the same or similar parts will not need to be further defined in subsequent drawings. In the following, embodiments and examples according to the present disclosure are described with reference to the accompanying drawings.

Figure 1:
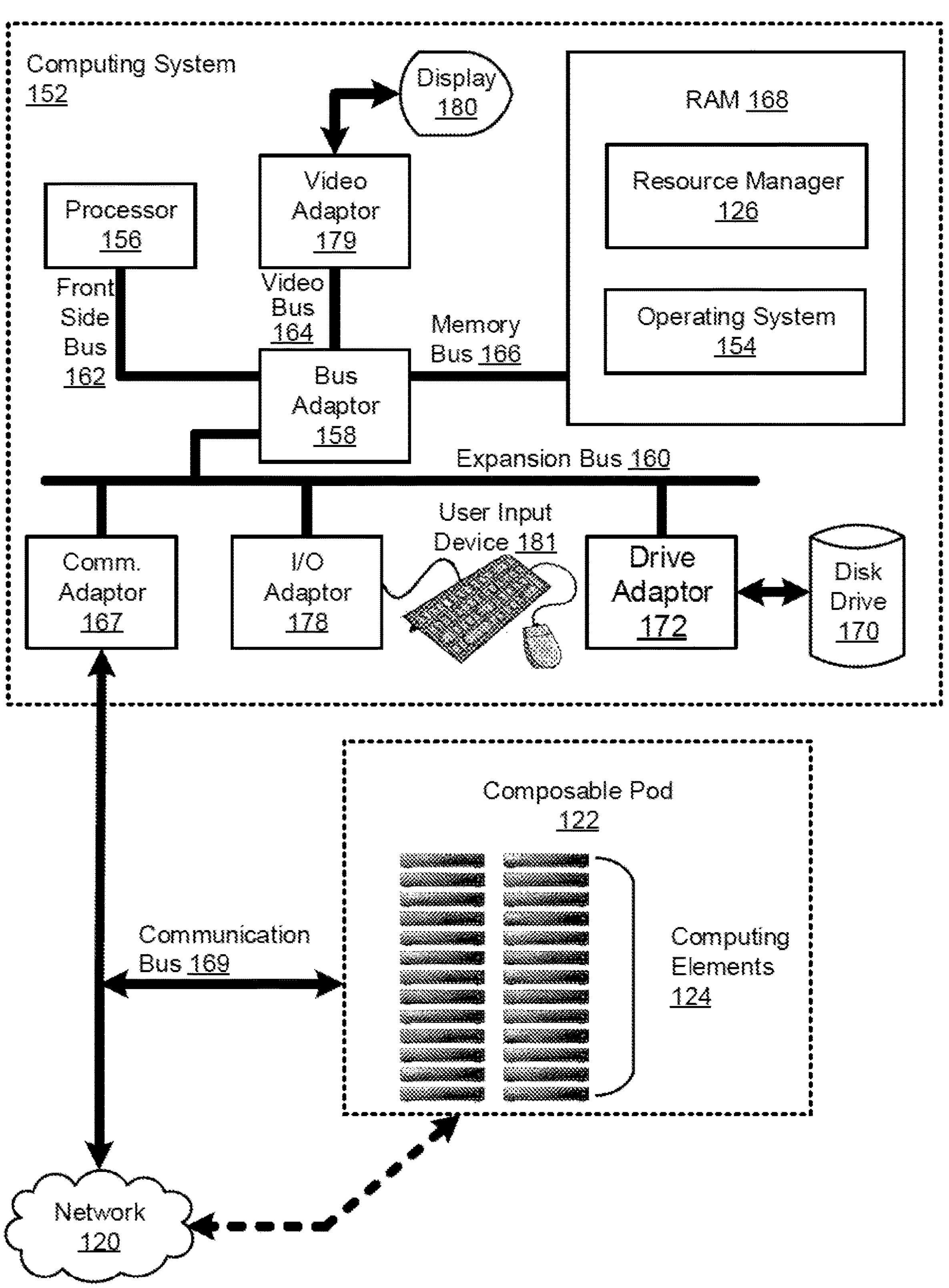
FIG. 1 illustrates a block diagram of an example adaptive event forwarding system according to some embodiments of the present disclosure.

FIG. 1 illustrates a block diagram of an exemplary computing system 152 configured for adaptive event forwarding according to some embodiments of the present disclosure. The computing system 152 of FIG. 1 includes at least one computer processor 156 or "CPU" and a random-access memory 168 ('RAM') which is connected to the processor 156 and to other components of the computing system 152 through a high-speed memory bus 166 and bus adapter 158.

The computing system 152 includes an operating system 154 stored in the RAM 168. The operating system 152 may be a UNIX™, Linux™, Microsoft Windows™, AIX™, IBM's iOS™, and other operating systems as will occur to those of skill in the art. While the operating system 154 is shown in the RAM 168 in FIG. 1, many components of such software are optionally stored in non-volatile memory also, such as, on a disk drive or data storage 170 in the computing system 152.

The computing system 152 further includes a resource manager 126 stored in the RAM 168. The resource manager 126 is a module containing computer program instructions for managing composable computing systems 122 with support for adaptive event forwarding. While the resource manager 126 is illustrated as a component separated from the operating system 154 in FIG. 1, in some embodiments, the resource manager 126 may be a part of the operating system 154 stored in the RAM 168.

The computing system 152 of FIG. 1 further includes a disk drive adapter 172 coupled through an expansion bus 160 and bus adapter 158 to the processor 156 and other components of the computing system 152. The disk drive adapter 172 connects non-volatile data storage to the computing system 152 in the form of a disk drive 170. The disk drive adapter 172 may be an Integrated Drive Electronics ("IDE") adapter, Small Computer System Interface ("SCSI") adapter, and other adapters as will occur to those of skill in the art.

The disk drive or data storage 170 may be a non-volatile computer memory, electrically erasable programmable read-only memory (so-called "EEPROM" or "Flash" memory), RAM drive, and so on, as will occur to those of skill in the art.

The computing system 152 further includes one or more input/output ("I/O") adapters 178. The I/O adapters may include computer display screens, as well as user input from user input devices 181 such as keyboards and mice. The computing system 152 of FIG. 1 also includes a video adapter 179, which is an example of an I/O adapter specially designed for graphic output to a display device 180, such as a display screen or computer monitor. The video adapter 179 is connected to the processor 156 through a high-speed video bus 164, the bus adapter 158, and the front side bus 162, which is also a high-speed bus.

The computing system 152 of FIG. 1 further includes a communications adapter 167 for data communications with other computers and for data communications with a data communications network. Such data communications may be carried out serially through RS-232 connections, through external buses such as a Universal Serial Bus ("USB"), through data communications networks such as IP data communications networks, and in other ways as will occur to those of skill in the art. Communications adapters implement the hardware level of data communications through which one computer sends data communications to another computer, directly or through a data communications network. Examples of communications adapters 167 include modems for wired dial-up communications, Ethernet (IEEE 802.3 adapters for wired data communications, and 802.11 adapters for wireless data communications.

The communications adapter 167 of the computing system 152 is connected to a composable pod 122 via a communication bus 169. The composable pod 122 is a collection of computing elements 124 able to be arranged (i.e., composable) into different configurations based on the data center or other infrastructure requirements. Examples of computing elements 124 include computer nodes (e.g., servers), memory, communications adapters (e.g., fabric switches), I/O adapters, drive adapters, and storage devices such as platter drives and solid-state drives. The composable pod 122 may be a set of computing elements 124 configured based on Intel's Rack Scale Design platform.

Additionally or alternatively, the communication adapter 167 of the computing system 152 is connected to the composable pod 122 via a network 120, which may be a wireless network for wireless data communication, so that the communication between the computing system 152 and the composable pod 122 is a wireless communication, as exhibited by the interrelated computing devices in a system of the Internet of Things (IoT). Accordingly, the resource manager 126 of the computing system 152 may manage the composable pod 122 through wired or wireless communication. For instance, the system and facility configurations are wired or wirelessly transmitted to the computing elements 124, and actual operation data and running states of the computing elements 124 are wired or wirelessly transmitted to the computing system 152 through the communication bus 169 or network 120 according to some embodiments of the present disclosure.

In some embodiment, the network 120 may also establish wireless communication between the computing system 152 with other systems or services (not shown in the figure). For instance, through the network 120, the computing system 152 may send and receive emails/messages from/to the computing terminals associated with different system administrators through the email or other wireless communication services (not shown) when performing adaptive event forwarding.

Figure 2:
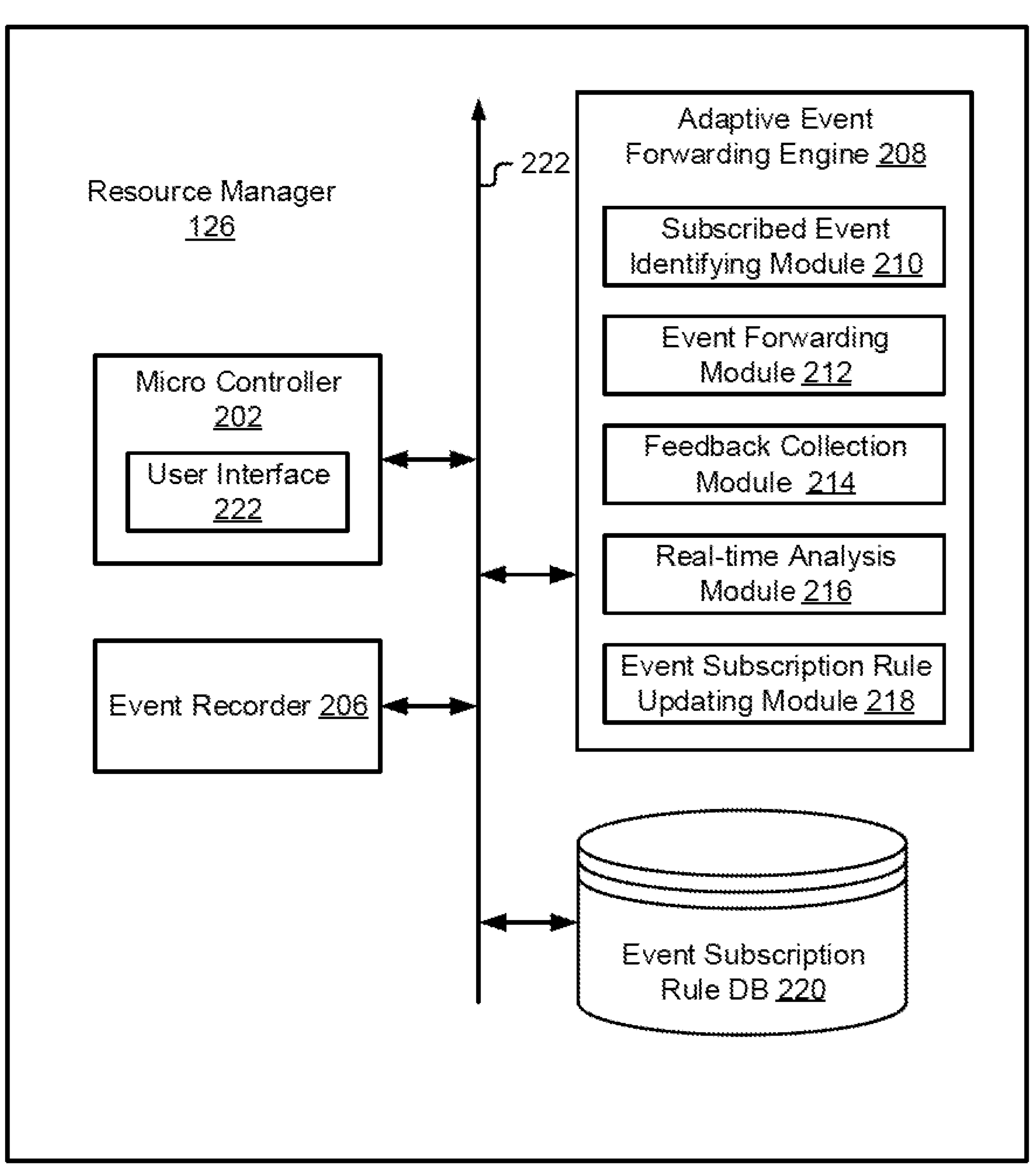
FIG. 2 illustrates a block diagram of an example resource manager included in an adaptive event forwarding system according to some embodiments of the present disclosure.

FIG. 2 is a block diagram of an exemplary resource manager 126 for managing composable compute systems with support for adaptive event forwarding according to some embodiments of the present disclosure. The exemplary resource manager 126 of FIG. 2 includes at least a micro controller 202, an event recorder 206, an adaptive event forwarding engine 208, and an event subscription rule database 220, each of which may communicate with each other through a bus 222 or communicate with other components of the computing system 152 and with the computing elements 124 in the composable pod 122 through the memory bus 166 and/or other buses and adapters.

The micro controller 202 includes computer program instructions for system administration of the computing elements 124 of the composable pod 122. The specific activities of the system administration may include inventory, configuration patterns, operating system images and deployment, firmware management and update, monitoring, and other different functions required in system administration. Each of these functions may be achieved with or without the assistance of a user interface 222 configured for use by different system administrators in system administration.

With respect to inventory in system administration, the micro controller 222 may identify the computing elements 124 in the composable pod 122, such as installed servers, storage, switches, chassis, racks, resource groups, and other hardware components under the management. Further controls may be also executed through the micro controller 222 after identification of each component, for instance, enabling and disabling a specific port for an identified internet switch. With respect to provisioning in system administration, certain configuration patterns may be set up for convenient hardware (e.g., a server) configuration. With respect to operating system deployment in system administration, certain operating system images may be pre-configured and selected for direction deployment to a particular system (e.g., a server). With respect to firmware management and update in system administration, firmware repository may provide a convenient access to the available firmware updates, and certain compliance policies may be further checked in selecting a proper firmware from the repository for firmware activation and update. Each of the foregoing activities and other non-described activities related to the system administration of the composable pod 122 may be executed by the micro controller 202 included in the resource manager 126.

With respect to monitoring in system administration, the micro controller 222 may monitor the health condition of the composable pod 122, and collect certain hardware and facility operation alerts, messages, and warnings for related hardware failures and facility maloperations in the composable pod 122, to draw respective personnel for caretaking. These hardware and facility operation alerts, messages, and warnings and other similar events relevant to system administration may be then distributed to certain recipients (e.g., different levels of system administrators) through an event forwarding process. More than one type of event forwarding process (e.g., a syslog forwarding or email forwarding) may be currently employed for delivery an alert, a message, or a warning to the respective recipients, depending on the configuration of the computing system 152 and user preference of system administrators.

For a specific recipient, not every alert, message, or warning needs to be forwarded. Instead, only certain alerts, messages, or warnings that the recipient cares about may be forwarded. Accordingly, through the user interface 222 included in the micro controller 202, certain event subscription rules may be defined for each recipient (e.g., for each system administrator). Proper filters or parameters applicable in defining event subscription rules may include a specific device, certain type of management activity, event type, event forwarding type (e.g., an email forwarding or syslog forwarding), event forwarding schedule, user preference, administration level, etc. In some embodiments, one recipient or event subscriber may have multiple associated event subscription rules. In some embodiments, different recipients or event subscribers may have similar event subscription rules (besides personal information).

In existing technologies, event subscription rules associated with a specific recipient are static once these rules are set up for the recipient. To change an event subscription rule, the subscriber or another relevant person responsible for system administration then needs to modify the current rule through the user interface 222 of the resource manager 126, which may be time-consuming and inconvenient.

With the introduction of an adaptive event forwarding engine 208 in the present disclosure, the event subscription rules for a specific recipient may be automatically and dynamically updated to reflect the instant interest of the recipient for the events that the recipient really cares about.

To achieve such function, the adaptive event forwarding engine 208 in the disclosed computing system 152 may include a subscribed event identifying module 210, an event forwarding module 212, a feedback collection module 214, a real-time analysis module 216, and an event subscription rule updating module 218. In addition, there may exist an event recorder 206 inside the resource manager 126 to record all events identified by the resource manager 126, and an event subscription rule database 220 for storing predefined and dynamically updated event subscription rules for different event subscribers or system administrators.

The subscribed event identifying module 210 may identify events (e.g., hardware and facility operation alerts, messages, and warnings) and the corresponding recipients that have subscribed to the identified events. The subscribed event identifying module 210 may rely on the event subscription rules stored in the event subscription rule database 220 to identify target recipients for event forwarding.

In some embodiments, the event subscription rules stored in the event subscription rule database 220 may be initially set up manually by the respective recipients or related personnel in charge of the event subscription process. For instance, these subscription rules may be initially set up according to the administration role, level, and other types of responsibilities defined for these recipients. In some embodiments, these event subscription rules may be initially set up through a training cycle supported by the adaptive event forwarding engine 208. In brief, during the training cycle for a recipient, a large variety and number of different events are actively forwarded to the recipient (e.g., a principle system administrator, general system administrator, or assistant system administrator) without necessarily relying on any event subscription rule. Feedbacks from the recipient are then collected and analyzed to determine the interest or preference of the recipient in the to-be-subscribed events. Through a certain period of training, a set of initial event subscription rules may be defined for the recipient.

The event subscription rules defined in the above-described approaches may be then stored in the event subscription rule database 220. When a new event occurs (e.g., a new event is reported to the event recorder 206), the corresponding recipient(s) associated with the new event may be identified by the subscribed event identifying module 210 according to the event subscription rules stored in the event subscription rule database 220. The new event may be then forwarded to the corresponding recipient(s).

The event forwarding module 212 may forward an event to the corresponding recipient(s) according to the event subscription rules in the event subscription rule database 220. The event may be forwarded to the recipient(s) through email or syslog message. Accordingly, when the event subscription rules are initially set up for the recipients, certain email and syslog information associated with the recipients are also included in these event subscription rules.

In some embodiments, the event forwarding module 212 may forward an event in a timely manner, that is, when the event is reported to the event recorder 206 and/or detected by the adaptive event forwarding engine 208. This is especially true for an event that is considered to be an emergency or critical. However, for events that are not so severe, the event forwarding process may be more flexible. In one example, a system and facility event may be forwarded based on a predefined schedule. In this way, multiple events accumulated within a certain period may be forwarded together to a same event subscriber, which then saves the resource for data communication.

In some embodiments, when forwarding an event, the event forwarding module 212 may also include an additional voting mechanism (which may be a survey or included in a survey). The voting mechanism or survey serves to identify a recipient's instant interest or preference for the events that the recipient hopes to receive. Accordingly, the voting mechanism or survey may include one or more questions or voting components for the recipient to respond. For instance, the voting mechanism or survey may include a question to ask whether the target recipient is interested in receiving the similar events in the future, or whether the forwarded event is valuable or not to the recipient. Other means of a survey or voting mechanism that allows a response or feedback from the target recipient to be collected are also contemplated. For instance, a voting mechanism or survey may include "thumb up" "thump down" buttons, include "subscribe" and "unsubscribe" buttons, include multiple buttons reflecting different interest levels of 1 to 10, or include multiple markable stars reflecting different interest levels, etc. These different surveys or voting mechanisms may be configured to allow a recipient's interest in a forwarded event to be identified based on the feedback or responses received from the recipient for these surveys or voting mechanisms.

The feedback collection module 214 may collect feedback or response to a voting mechanism or survey for an event forwarded to the respective recipient(s). Feedback or response may be a reply or response to an aforementioned survey or voting mechanism included in the event forwarding process. When a target recipient responds to a survey or voting mechanism, the recipient may send the response or feedback back to the adaptive event forwarding engine 208. The response or feedback may be sent back to the resource manager 126 in a same way that the survey or the voting mechanism was transmitted to the recipient (e.g., by email or message). Based on the received feedback or response, the event subscription rule(s) for the recipient may be automatically modified or updated to reflect his instant interest in certain events he really cares about at this moment. In this way, the recipient or the relevant person does not need to manually access the user interface 222 of the resource manager 126 to modify his event subscription rules, but just responding to the survey or the voting mechanism, which is very convenient for the recipient to update his event subscription rules.

In some embodiments, not every event forwarding process may include a survey, especially when the managed composable pod 122 has been operating smoothly for quite a little while or when there are no recent administration role changes among the system administrators. For instance, to save the resources, a survey may be delivered to the respective recipients only periodically (e.g., every Monday for recipient A, etc.) or on-demand (e.g., at a moment when a target recipient has just changed his role in system administration), but not in each event forwarding process.

In some embodiments, even without a specific survey or voting mechanism, feedback or response may still be collected from a recipient by the feedback collection module 214. For instance, feedback or response may be collected when a target recipient unsubscribes an event forwarding email through a service provided by the email service provider, or the target recipient directly deletes an event forwarding related email without reading actual content in the email, etc.

In some embodiments, feedback or response may be also collected when a target recipient replies to an event forwarding email that does not include a survey or voting mechanism. The replied email may include key words to reflect the recipient's interest or preference change. For instance, the key words may include "unsubscribe," "remove me," "do not like," "not valuable," or other similar words that reflect the recipient's interest or preference change. These key words may be readily recognized by the adaptive event forwarding engine 208 with the recent advancement of artificial intelligence technology. These recognized key words from the replied email may also reflect a user interest, which are thus captured by the feedback collection module 214.

The real-time analysis module 216 may analyze a response or feedback collected by the feedback collection module 214, and determine whether an event subscription rule needs to be updated. The real-time analysis module 216 may determine to maintain current event subscription rule(s) for a recipient if the recipient indicates that the event forwarded to him is valuable or modify the current event subscription rule(s) to include more similar events if the recipient wants to receive more similar events. However, if the feedback or response from the recipient indicates that the recipient does not care about the event forwarded to him anymore, the event subscription rule(s) associated with the recipient may then be modified to exclude similar events in the future.

In some embodiments, instead of monitoring the feedbacks or responses from a user, the real-time analysis module 216 may analyze the user activity of a system administrator to infer which events the administrator might be interested in. For instance, the resource manager 126 may determine that the system administrator is configurating a server based on the context of the current user activities of the system administrator. Therefore, configuration-related events specific to that server may be likely interesting to the system administrator, and thus, event subscription rules for the system administrator may be modified to allow instant forwarding configuration-related events specific to that server to the system administrator.

In some embodiments, the real-time analysis module 216 may also infer which events an administrator might be interested in or not based on other factors. For instance, the real-time analysis module 216 may recognize that the air conditioner in a data center facility is under repairment. Even extreme-temperature alerts for that data center facility keep getting reported, the real-time analysis module 216 may determine that these events are not what the system administrator really cares about at that moment, and thus the event subscription rules for the temperature alert-related events may be timely modified, so as not to forward such events to the system administrator until the repair is completed.

The event subscription rule updating module 218 may update the event subscription rules for a recipient based on the analysis conducted by the real-time analysis module 216. For instance, if the analysis indicates that the event subscription rule(s) associated with the recipient needs to be updated, the event subscription rule updating module 218 may update one or more rules associated with the recipient. For instance, the current event subscription rule(s) associated with the recipient may be modified to exclude the events that the recipient is not interested in. In some embodiments, certain similar events may also be excluded simultaneously when the event subscription rule(s) associated with the recipient is modified or updated.

In some embodiments, the event subscription rule updating module 208 may update the event subscription rules for a recipient without considering the analysis conducted by the real-time analysis module 216. Instead, the event subscription rule updating module 208 may update the event subscription rules for the recipient based on the responsibility and/or administration level change associated with the recipient. For instance, if the recipient changes the administration level recently, the associated responsibility will change accordingly, which may then necessarily change the events that the recipient cares about or is responsible for. For instance, a system administrator promoted from a junior level to a senior level will likely care more about system and facility events with greater importance or alerts or warnings with higher severity. The event subscription rule updating module 208 may automatically update the event subscription rules for the administrator to reflect such change.

The event subscription rule updating module 218 may further store the updated event subscription rule(s) associated with the recipient in the event subscription rule databases 220. Consequently, when a new event occurs, the updated event subscription rules, instead of the static subscription rules in the existing technologies, are then used to check whether the event should be forwarded to the recipient. In this way, the event forwarding process can be adaptively and dynamically updated to reflect the recipient's instant interest and preference for the events he really cares about, without requiring the recipient or relevant person to frequently access the user interface 222 of the resource manager 126 to manually change the event subscription rules for the recipient.

In the following, various implementations of the disclosed adaptive event forwarding engine 208 will be described with reference to the accompanying drawings.

Figure 3:
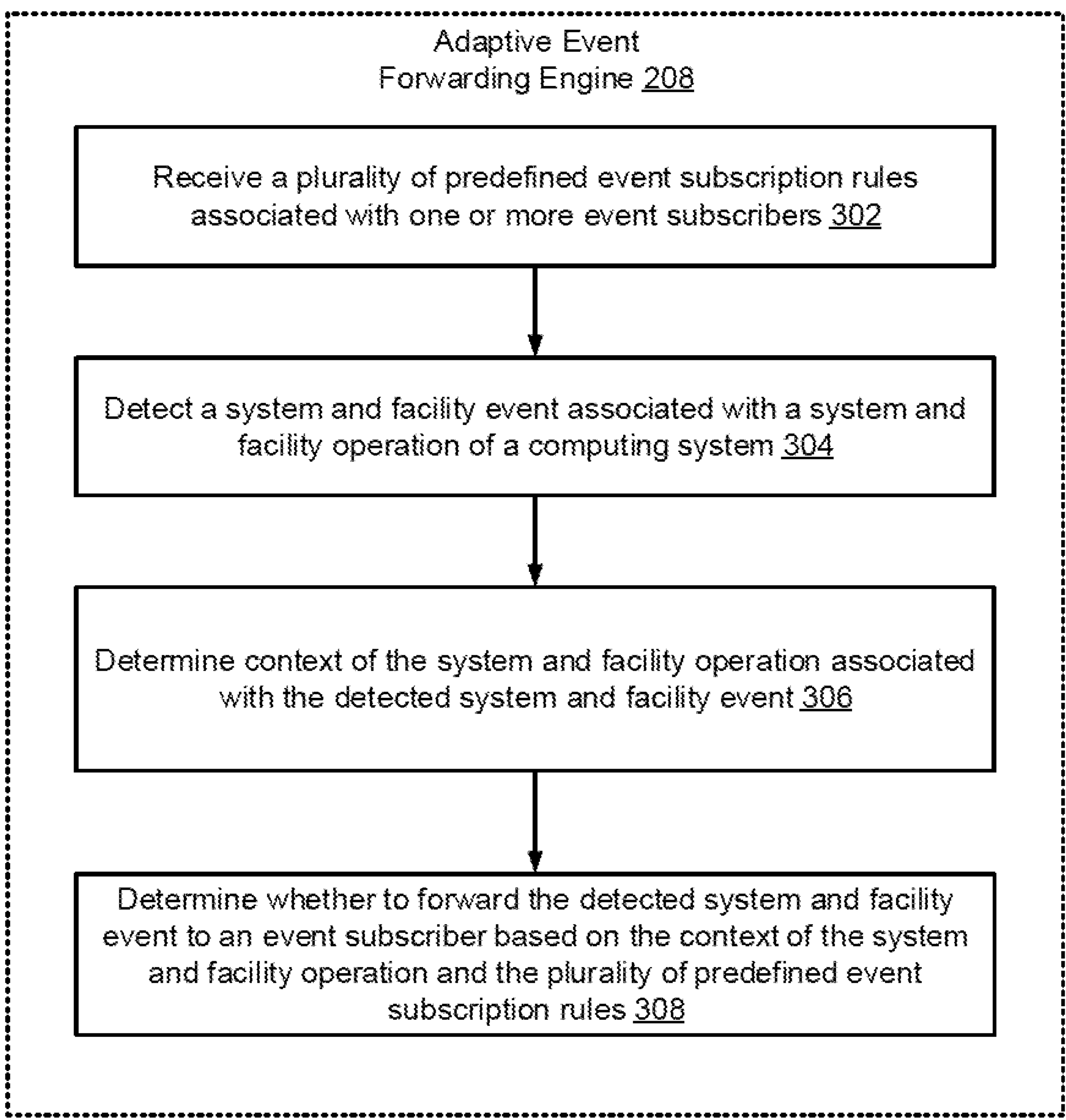
FIG. 3 illustrates a flow chart of an example adaptive event forwarding method according to some embodiments of the present disclosure.

FIG. 3 illustrates a flow chart of an example method for managing composable computer systems with support for adaptive event forwarding according to some embodiments of the present disclosure.

The method of FIG. 3 includes receiving a plurality of predefined event subscription rules for one or more even subscribers at step 302. Monitoring the health condition of the composable pod 122 requires certain events, especially certain hardware and facility alerts and warnings, to be forward to the proper system administers, so that instant action(s) can be taken if necessary, to prevent system failure or dysfunctions of certain parts of the composable pod 122. Accordingly, a plurality of event subscription rules covering different aspects of system administration may be initially predefined for the system administrator(s). The plurality of event subscription rules may be predefined in general based on the roles and responsibilities of the personnel responsible for the system administration, or in other ways as described earlier. The predefined event subscription rules for different system administrators may be stored in the event subscription rule database 220. Once these event subscription rules are defined, these rules may be utilized to determine whether and/or to whom a system and facility event should be forwarded.

Next, the method of FIG. 3 identifies a system and facility event according to a system and facility operation at step 304. A system and facility event, in a computing context, is an action or occurrence that can be identified by a program and has significance for system hardware and software. For instance, certain events may occur when configuring a server, deploying an operating system, updating firmware, or when certain facilities run abnormally (e.g., temperature extremely high for a storage drive or flash node, unusual voltage, power supply failure, etc.). These different events may be detected by service processors or other components within computing elements 124 of the composable pod 122, and may be forwarded to a centralized computer (e.g., the computing system 152) in a format of a message, token, count pattern, value, marker, etc.

For example, one or more of the computing elements 124 in the composable pod 122 may include respective service processors that monitor the operation or physical state of the same or other computing elements 124 (e.g., servers). The service processor features vary by manufacturer and may include remote power-cycling of devices, monitoring of a server's on-board instrumentation (temperature, CPU status, fan speed, and voltage), remote console access via Serial over LAN (SoL), and the ability to set event traps and perform OS-level shutdown. Some service processors 102 also allow for data logging, KVM (keyboard, video, and mouse) control, and virtual media. The different activities executed by the service processors may trigger different events to be generated in the computing elements 124. Accordingly, the service processors 102 in the computing elements 124 may communicate with system administration tools in the computing elements 124 through a special management connection, to report the events monitored by the service processors 102. In some embodiments, the service processors 102 in the computing elements 124 may further forward or report, through the respective system administration tools, these events to a centralized computer (e.g., the computing system 152) for notification by system administrators or for further processing (e.g., for adaptive event forwarding).

In some embodiments, as a centralized computer, the computing system 152 may enable an event collector to create subscriptions on local or remote computing elements 124 in the composable pod 122 to allow the aforementioned events to be forwarded to the computing system 152.

As illustrated in FIG. 2, the resource manager 126 may further include an event recorder 206 to record all events that are forwarded or reported to the resource manager 126 by the computing elements 124 in the composable pod 122. In some embodiments, the event recorder 206 of the resource manager 126 may further organize the received different events in different ways for easy event handling, e.g., organize the events by event type, severity level, facility, timestamp of occurrence, etc. For instance, the events may be organized according to event types: application events, system events, and security events, etc. For another instance, the events may be organized according to different severity levels: emergency, alert, critical, error, warning, notification, informational, debugging, etc. For another instance, the events may be organized according to process, modules, protocols, etc. Alternatively, the events may be merely organized according to the timestamps to indicate the date and time when the events were created, or the events are organized according to an order in which multiple events occur in a specific process (e.g., a system update may include a sequence of events). Additional ways for organizing different events identified from the system and facility operations are also contemplated and are not further detailed here. Through the classification and organization, an event subjected to adaptive event forwarding can be easily determined. For instance, based on timestamp, a new event just occurred in the event recorder 206 may be subjected to adaptive event forwarding processing. For another instance, based on an on-demand request, events related to a specific computing element at a specific time in the event recorder 206 may be identified for adaptive event forwarding processing, as described further in detail below.

The method of FIG. 3 further includes determining context of the system and facility operation associated with the detected system and facility event at step 306. This may include determining any information that is related to the detected system and facility operation and the associated events. For instance, upon detection of the system and facility event, the resource manger 126 may determine the context of the system and facility operation associated with the event by collecting the information related to the system and facility operation. This may include identifying under what condition the operation is started/initiated, the specific user(s) that initiates the operation or plays a certain role in the operation, what event(s) is generated throughout the operation, etc. For instance, if a system administrator configures a computing system, deploys an operating system, or updates firmware, the resource manager 126 may identify the system administrator that performs the operation(s) based on the login information. In addition, the resource manager 126 may also determine a sequence of events related to the operation(s) conducted by the system administrator based on the system log information. Taking system update as a specific example, during the update, there is a period of time when code is sent down to the programming controller to write the new version to the RAM, a sequence of events will be generated during the process, such as 10% complete, written block #3, block #4, and so on. These events will be generated for that specific system update, which can then be easily recognized by the resource manager 126 if the context of the system update operation is monitored. The determination of the foregoing context of the system and facility operation associated with the detected system and facility event may then facilitate a determination of whether the detected system and facility event should be forwarded to an event subscriber.

At step 308, the method of FIG. 3 further determines whether to forward the detected system and facility event to an event subscriber based on the context of the system and facility operation and the plurality of predefined event subscription rules. That is, the adaptive event forwarding engine 208 will rely on the context of the system and facility operation associated with the detected system and facility event and the event subscription rules in the database 220 for event forwarding.

By determining whether to forward the detected system and facility event to an event subscriber based on both the context of the system and facility operation and the event subscription rules, the adaptive event forwarding engine 208 may not just consider a user's event preference reflected by event subscription rules in event forwarding, but also consider an instant situation that may affect a user's interest in certain events. In this way, a dynamic and more accurate event forwarding process may be achieved.

For instance, for the execution of firmware update of the computing elements 124 in the composable pod 122, the process may require reset and restart multiple elements 124 contained in the composable pod 122. Each of these restarts may create an alert (i.e., a system and facility event). These alerts or events could be used as a rough progress indicator for a system administrator that is implementing the firmware update, and thus might be interesting to that system administrator. However, for other system administrators that have subscribed to the system restarts but are not involved in the firmware update, these alerts and events may be considered as a side effect of the firmware update. By analyzing the context of the firmware update operation, the adaptive event forwarding engine 208 may determine that these alerts or events will be of no interest to these other system administrators, and thus elect to not forward the alerts/events to these other system administrators. For specific detail regarding when to forward the detected system and facility event to an event subscriber based on the context of the system and facility operation and when to forward the detected system and facility event based on the plurality of event subscription rules, may refer to the description in FIG. 4.

Figure 4:
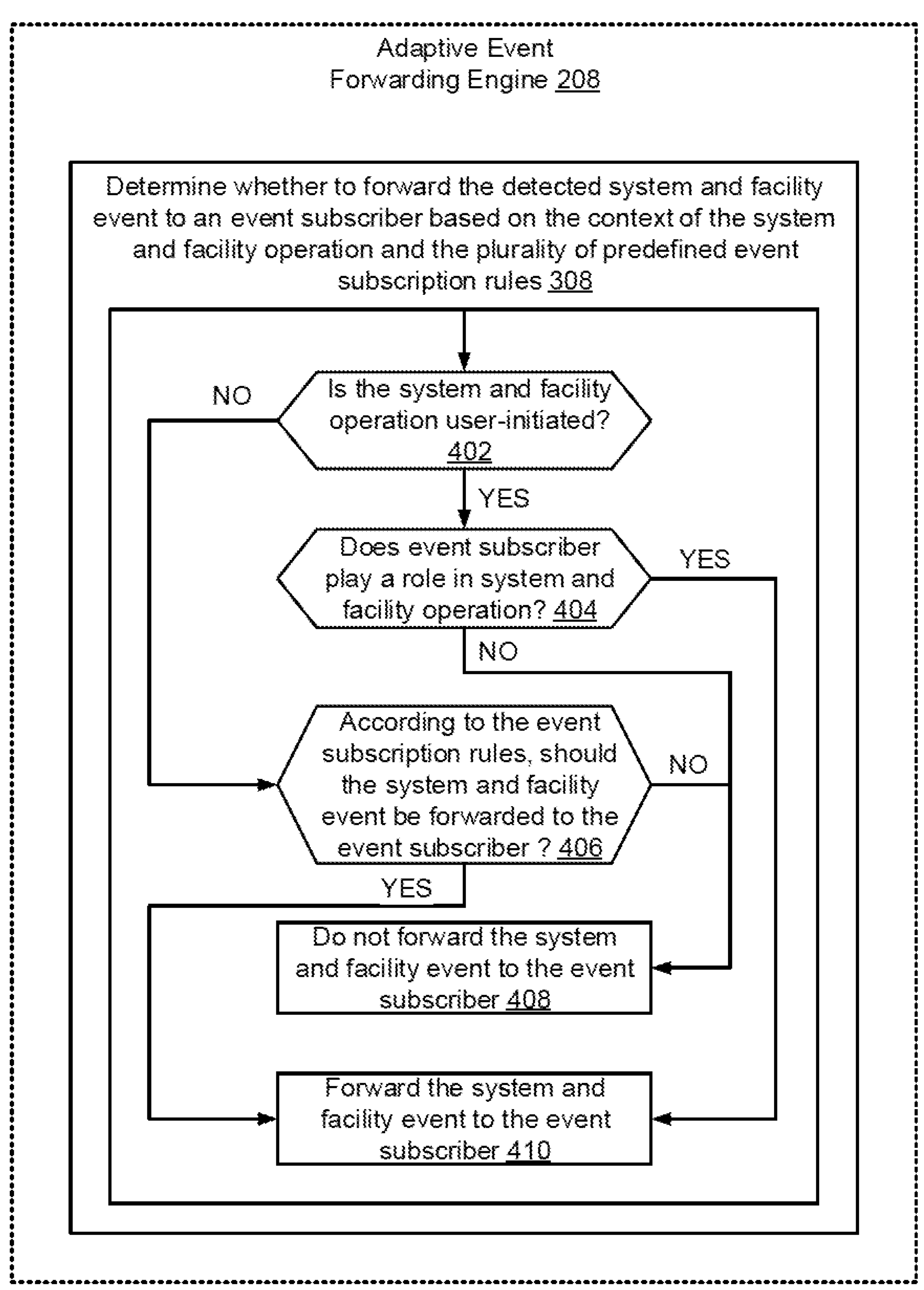
FIG. 4 illustrates a flow chart of an example method for determining whether to forward a detected system and facility event to an event subscriber based on context of the system and facility operation and a plurality of predefined event subscription rules according to some embodiments of the present disclosure.

FIG. 4 illustrates a flow chart of an example method 308 for determining whether to forward the detected system and facility event to an event subscriber based on the context of the system and facility operation and the plurality of predefined event subscription rules according to some embodiments of the present disclosure.

As illustrated in the figure, the method 308 first determines whether to forward the detected system and facility event based on the context of the associated system and facility operation. In determining whether to forward the detected system and facility event to an event subscriber based on the context of the system and facility operation, at step 402, the method 308 may first determine whether the system and facility operation associated with the system and facility event is user-initiated. Here, a user-initiated system and facility operation may refer to a situation in which the system and facility operation is enabled or initiated due to a specific reason beyond a general propose or procedure. For instance, for a system restart, while it is mostly caused by a user action, if the system restart is just a general procedure to turn on a computing system, the system restart may be not necessarily considered as a user-initiated system and facility operation by the adaptive event forwarding engine 208. However, if the system restart is caused by an operating system deployment/update, system configuration/reconfiguration, system repairment, or other user-initiated servicing, the system restart may be then not considered as a general procedure, but rather due to a special reason, and thus considered as, or being caused by, a user-initiated system and facility operation. By monitoring the running state of the specific computing system and/or user activities associated with the computing system, the system update/deployment, configuration/reconfiguration, as well as the specific users involved in these processes, may be then identified, which then help determine whether the detected system and facility operation is a user-initiated operation and/or who initiates the detected system and facility operation.

If it is determined that the system and facility operation is user-initiated due to certain reasons, the method 308 may proceed to determine whether the event subscriber plays a role in the user-initiated system and facility operation at step 404. For instance, if the system and facility operation is user-initiated, the resource manager 126 may use the management tools or other resources to determine who initiates the system and facility operation and/or who else may play a role in the system and facility operation. For instance, a system update/deployment process may get both a system administrator and an assistant system administer involved, in which case both the system administrator and the assistant system administrator may play a role in the user-initiated system and facility operation (i.e., system update/deployment). In this scenario, the detected system and facility event associated with the system and facility operation is then forward to both the system administrator and the assistant system administrator at step 410.

In some embodiments, when forwarding the detected system and facility event to the event subscriber(s) at step 410, the adaptive event forwarding engine 208 may not just forward the detected system and facility event associated with the user-initiated system and facility operation, but also identify and subsequently forward other system and facility events associated with the user-initiated system and facility event. Through determining a sequence of events associated with the system and facility operation, the adaptive event forwarding engine 208 may automatically forward all events associated with the system and facility operation to the event subscriber(s) involved in the operation. That is, the adaptive event forwarding engine 208 may automatically "turn on" the event forwarding process during this user-initiated system and facility operation. Moreover, by identifying the sequence of events associated with the user-initiated system and facility operation, the adaptive event forwarding engine 208 may also determine which event(s) is the last event to be forwarded, and thus automatically "turn off" the event forwarding process for the involved system after the user-initiated system and facility operation is complete. That is, the events for the involved system will not be automatically forwarded to the associated event subscriber(s) after the user-initiated system and facility operation is complete. In this way, the adaptive event forwarding engine 208 may achieve the service-based or operation-based "turn on" and "turn off" function in adaptive event forwarding.

In some embodiments, if an event subscriber does not play a role in the system and facility operation, the one or more events associated with the system and facility operation will then not be forwarded to the event subscriber at step 408, even if the event subscriber has subscribed an event that may occur during the system and facility operation. For instance, even an event subscriber has subscribed system restarts for the system, however, since the system restarts have occurred during a user-initiated system and facility operation that is initiated by other users, the adaptive event forwarding engine 208 would not follow the event subscription rules in event forwarding. In this way, the event subscriber will not be flooded with events that he will not care about since he is not involved in this specific user-initiated system and facility event, thereby achieving the adaptive event forwarding.

In some embodiments, the system and facility operation associated with the detected system and facility event may be not user-initiated, the method 308 then proceeds to determine whether to forward the detected system and facility event to an event subscriber according to the event subscription rules associated with the event subscriber at step 406. That is, if the system and facility operation associated with the detected system and facility event is not a "user-initiated" system and facility operation, the adaptive event forwarding engine 208 may rely on the event subscription rules to determine whether to forward the detected event to an event subscriber. If the event subscriber has not subscribed the detected system and facility event according to the event subscription rules in the database 220, the adaptive event forwarding engine 208 may not forward the detected system and facility event to the event subscriber at step 408. However, if the event subscriber has subscribed the detected event, the adaptive event forwarding engine 208 may forward the detected event to the event subscriber at step 410.

While the "user-initiated" operation-based event forwarding allows an adaptive event forwarding process to be achieved, the event subscription rule-based event forwarding may also provide an adaptive event forwarding process, as further described in detail below with reference to FIG. 5.

Figure 5:
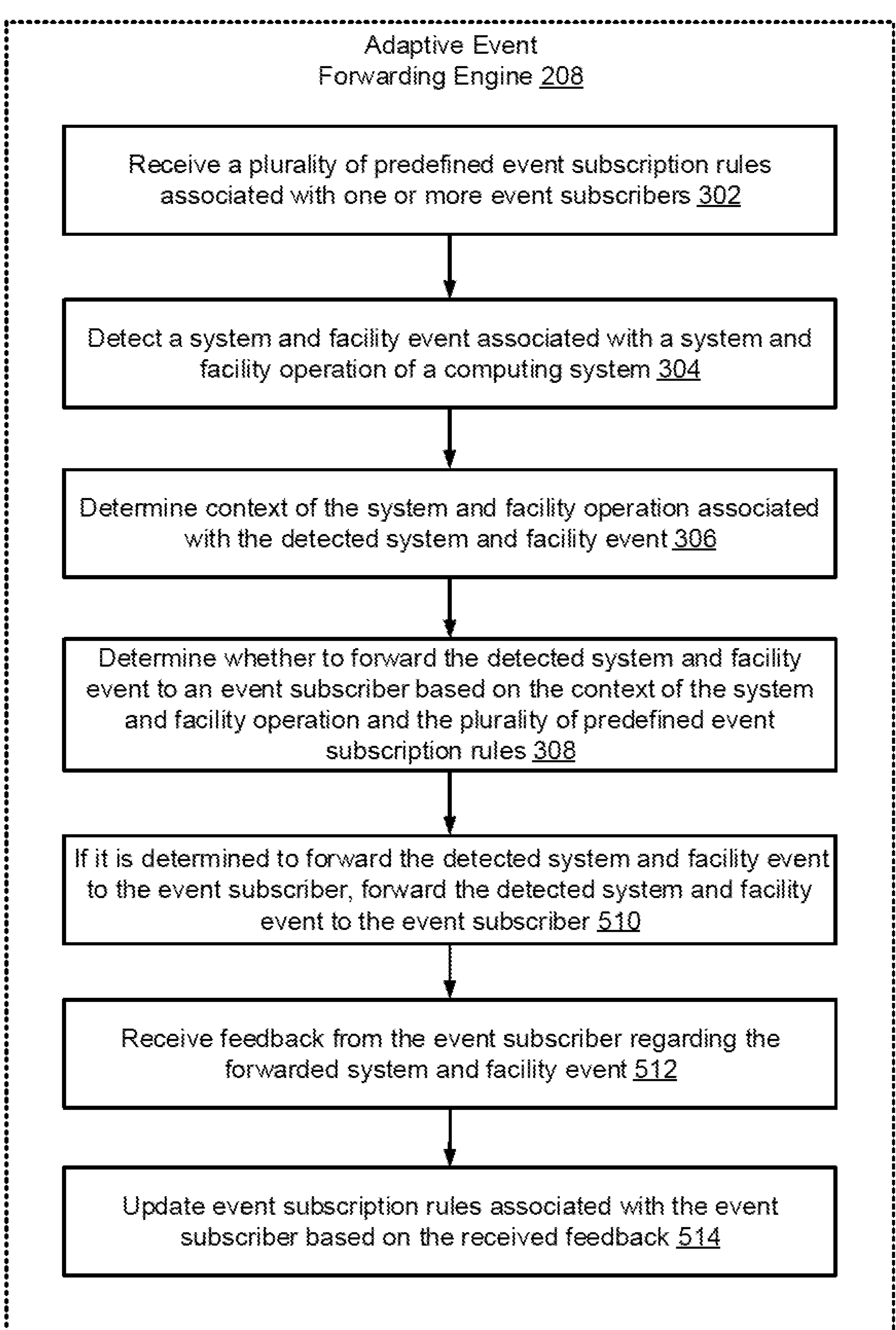
FIG. 5 illustrates a flow chart of an example method for a feedback-based update of event subscription rules according to some embodiments of the present disclosure.

FIG. 5 illustrates a flow chart of an example method for a feedback-based update of event subscription rules according to some embodiments of the present disclosure. In the disclosed method, after it is determined that the detected system and facility event should be forwarded to an event subscriber at step 308, the adaptive event forwarding engine 208 forwards the detected system and facility event to the event subscriber at step 510.

As discussed earlier with reference to the even forwarding module 212 in FIG. 2, in some embodiments, the event forwarding process may include a voting mechanism or a survey to determine whether the recipient is interested in the forwarded event. Accordingly, at step 512, the method of FIG. 5 further includes receiving feedback from an event subscriber to indicate whether the event subscriber is interested in a received event forwarded to him. As discussed elsewhere herein, different administrators may have different interests in the events that occur in a system (e.g., the composable pod 122). For instance, a network administrator may be interested more in the network-associated problems, and thus may provide a positive feedback on network-related events, but not on server-related events. A system administrator, however, cares more about the server problems, and thus may provide a positive feedback on server-related events, but not on network-related problems. Similarly, an application administrator may provide a positive feedback on the events providing information about the application states.

In some embodiments, when a system administrator only cares about specific server-related events for a short period of time (e.g., during system configuration), he may "turn on" event subscription rules for that specific server for a certain period of time by consistently thumbing up events related to that specific server at the early stage of that specific period of time. After that certain period of time, if the system administrator determines that he does not care about that specific server any more, he may consistently thumb down events related to that specific server, so that the specific server-related events may not be further forwarded to the system administrator.

Accordingly, based on the feedback received from different administrators or from the same administrator at different moments, it can be dynamically determined which events a system administrator is really interested in.

At step 512, the method of FIG. 5 further includes updating event subscription rules for an event subscriber based on the received feedback. This may include excluding more similar events when negative feedback is received, or including more similar events to be forwarded to the event subscriber when positive feedback is received. That is, if positive feedback is received from the event subscriber, this means that the event subscriber is interested in the detected system and facility event forwarded to him, and thus the adaptive event forwarding engine 208 will maintain or update the event subscription rules associated with the event subscriber by including more similar system and facility events to be forwarded to the event subscriber in the future. However, if negative feedback is received, this means that the event subscriber is not interested in the system and facility event forwarded to him, and thus the adaptive event forwarding engine 208 will update the event subscription rules associated with the event subscriber by electing to not forward similar system and facility events to the event subscriber anymore. The negative feedback may mean that the event subscriber has changed his interest in certain system and facility events when compared to the moments when the previous version of event subscription rules is defined or updated. This could happen due to a variety of reasons, such as role change, responsibility change, or user preference change, etc. By dynamically updating the event subscription rules associated with each event subscriber, the events selected for forwarding by the adaptive event forwarding engine 208 may more accurately reflect the instant interest of each event subscriber.

It is to be noted that the aforementioned similar events may have different meanings under different situations when updating event subscription rules. In general, the similar system and facility events may mean that these events are of the same type, occur in the same or similar computing systems, have the same severity, and/or require the same level of responsibility, etc. However, under certain circumstances, the similar system and facility events may mean that these events are closely related but are not necessarily the same type, the same severity, etc. For instance, for user-initiated system and facility operations, such as system deployment/update, configuration/reconfiguration, repairing, and maintenance, certain events necessarily occur together as a sequence of events. In these situations, although each of the sequence of events may not necessarily be the same type. However, since these events always occur together with each other, these events may also be considered as the similar events in adaptive event forwarding. Therefore, upon detection of a first event of the sequence of events, if the event subscriber provides positive feedback for this first event, the adaptive event forward engine 208 may automatically forward the subsequent events included in the sequence of events associated with the operation to the event subscriber. On the other hand, if the event subscriber provides negative feedback to the first event, the adaptive event forwarding engine 208 then stops forwarding the subsequent events included in the sequence of events to the event subscriber.

Through the foregoing processes described in FIG. 5, event subscription rules associated with each event subscriber may be then automatically and dynamically updated. This does not require a system administrator to manually modify an event subscription rule each time he hopes to change events he really cares about, which is more convenient, more efficient, and less time-consuming when compared to the existing "static rules" approach.

It is to be noted that under certain circumstances, the adaptive event forwarding engine 208 may update event subscription rules for an event subscriber or system administrator without necessarily receiving any feedback from the event subscriber. As previously described, the adaptive event forwarding engine 208 may update event subscription rules for an event subscriber based on the recent role changes, the patterns of behavior of the administrator (e.g., the administrator is configuring a server), or based on the facility state (e.g., the air conditioner in a data center is under repairment), etc. Other factors that obviously affect a system administrator's interest in certain events may also be considered by the adaptive event forwarding engine 208. For instance, event subscription rules for a specific event subscriber may be adaptively updated based on the event subscription rule updates for other event subscribers, especially when these event subscribers have similar administration roles. By including as many factors as possible in adaptively updating event subscription rules for a specific event subscriber, the updated event subscription rules can more accurately reflect the event subscriber's interest. In this way, the events forwarded to the event subscriber may be minimized without affecting the actual system administration liabilities.

It should be also noted that while the adaptive event forwarding engine 208 has been descried as being located at the centralized computing system 152, in some embodiments, the adaptive event forwarding engine 208 may be located inside a computing element, e.g., a server, in the composable pod 122. For instance, a server in the composable pod 122 may include a system administration tool as well as an adaptive event forwarding engine 208. Correspondingly, an event recorder 206 and an event subscription rule database 220 may also be located within the server. The events collected by the system administration tool in the server are then subjected to similar adaptive event forwarding as discussed elsewhere herein. Accordingly, instead of forwarding the events to the centralized computing system 152, a server in the composable pod 122 may adaptively forward events detected in each server 124 to the corresponding system administrators. In some embodiments, a server in the composable pod 122 may also manage events for other computing elements 124 in the composable pod 122. For instance, a server in the composable pod 122 may also monitor storage devices, chassis, certain other servers, etc., and adaptively forwards events related to these other computing elements 124 through adaptive event forwarding processing. By setting up different levels of adaptive event forwarding, it may be ensured that the event forwarding process in the disclosed system achieves a high level of accuracy without the sacrifice of the reliability of event forwarding in the system administration.

The various aspects of the disclosure are described with reference to the flowcharts and/or the block diagrams of the methods, the systems (apparatuses), and the computer program products according to the embodiments of the present disclosure. It should be understood that every block of the flowcharts and/or the block diagrams or any combination of the blocks in the flowcharts and/or the block diagrams can be realized by computer-readable program instructions.

These computer-readable program instructions may be provided to a processor of a general purpose computer, a special purpose computer, or any other programmable data processing apparatus to generate a machine such that when the instructions executed by the processor of the computer or other programmable data processing apparatus, an apparatus may be created to implement the function/action specified in one or more blocks of the flowcharts and/or the block diagrams. These computer-readable program instructions may also be stored in a computer readable storage medium. These instructions may control the computer, the programmable data processing apparatus, and/or any other device to function in a particular manner such that the computer-readable medium having instructions stored thereon may include a manufacturing product, which comprises instructions implementing various aspects of the function/action specified in one or more blocks of the flowcharts and/or the block diagrams.

The computer-readable program instructions may also be loaded onto a computer, other programmable data processing apparatus, or other devices to allow execution of a series of operational steps on the computer, other programmable data processing apparatus, or other devices, and thus produce a computer-implemented process. As such, the instructions executed on the computer, other programmable data processing apparatuses, or other devices may realize the function/action specified in one or more of the blocks in the flowcharts and/or the block diagrams.

The flowcharts and the block diagrams in the accompanying figures illustrate the architecture, the functionality, and the operation of possible implementations of the systems, the methods, and the computer program products according to various embodiments of the present disclosure. In this regard, each block of the flowcharts or the block diagrams can represent a module, a program section, or a portion of an instruction that contains one or more instructions for implementing executable instructions of a specified logic function. In some alternative implementations, the functions labeled in the blocks may occur in an order different from the order noted in the figures. For example, two consecutive blocks may in fact be executed substantially in parallel, and sometimes they may be executed in the reverse order, depending on the functions involved. It is also to be noted that each block of the block diagrams and/or the flowcharts, and any combination of the blocks in the block diagrams and/or the flowcharts, can be implemented by special purpose hardware-based systems that perform specified functions or actions, or may be implemented using a combination of dedicated hardware and computer instructions. It is well known to those skilled in the art that the implementation by hardware, the implementation by software, and the combination by software and hardware are all equivalent.

The various embodiments of the present disclosure have been described above. The above description is exemplary, not exhaustive, and is not intended to be limited to the disclosed embodiments. Many modifications and variations should be apparent to those skilled in the art without departing from the scope and the spirit of the illustrated embodiments. The terminology used herein was chosen to best explain the principles of the embodiments, the practical applications, or the improvements to the techniques in the market, or to enable others of ordinary skill in the art to understand the embodiments disclosed herein. The scope of the disclosure is defined by the appended claims.

What is claimed is:

1. An adaptive event forwarding method, comprising:

receiving a plurality of predefined event subscription rules associated with one or more event subscribers;

detecting a system and facility event associated with a system and facility operation of a computing system;

determining context of the system and facility operation associated with the detected system and facility event;

determining whether to forward the detected system and facility event to an event subscriber from the one or more event subscribers based on the context of the system and facility operation and the plurality of predefined event subscription rules;

in response to determining to forward the detected system and facility event to the event subscriber based on the one or more event subscription rules associated with the event subscriber, forwarding the detected system and facility event to the event subscriber;

receiving feedback from the event subscriber regarding the system and facility event forwarded to the event subscriber;

updating the one or more event subscription rules associated with the event subscriber based on the received feedback; and determining whether to forward a subsequent system and facility event to the event subscriber based on the updated one or more event subscription rules associated with the event subscriber.

2. The method according to claim 1, wherein determining whether to forward the detected system and facility event to the event subscriber based on the context of the system and facility operation and the plurality of predefined event subscription rules comprises:

determining whether the system and facility operation is a user-initiated system and facility operation based on the context of the system and facility operation;

if the system and facility operation is a user-initiated system and facility operation, determining whether the event subscriber plays a role in the detected system and facility operation based on the context of the system and facility operation; and if the event subscriber does not play a role in the detected system and facility operation, electing not to forward the detected system and facility event to the event subscriber.

3. The method according to claim 2, further comprising:

if the event subscriber plays a role in the detected system and facility operation, electing to forward the detected system and facility event to the event subscriber.

4. The method of according to claim 3, further comprising:

electing to forward one or more additional system and facility events associated with the system and facility operation to the event subscriber, wherein the system and facility operation includes a sequence of associated system and facility events.

5. The method according to claim 2, further comprising:

if it is determined that the system and facility operation is not a user-initiated system and facility operation, determining whether to forward the detected system and facility event to the event subscriber based on one or more event subscription rules associated with the event subscriber.

6. The method according to claim 1, wherein updating the one or more event subscription rules associated with the event subscriber based on the received feedback comprises:

if the received feedback is positive, updating the one or more event subscription rules associated with the event subscriber by electing to forward a subsequent system and facility event similar to the detected system and facility event to the event subscriber; and if the received feedback is negative, updating the one or more event subscription rules associated with the event subscriber by electing not to forward a subsequent system and facility event similar to the detected system and facility event to the event subscriber.

7. A computer program product comprising a non-volatile computer readable storage medium and program instructions stored therein, the program instructions being configured to be executable by a computer to cause the computer to perform operations comprising:

receiving a plurality of predefined event subscription rules associated with one or more event subscribers;

detecting a system and facility event associated with a system and facility operation of a computing system;

determining context of the system and facility operation associated with the detected system and facility event;

determining whether to forward the detected system and facility event to an event subscriber from the one or more event subscribers based on the context of the system and facility operation and the plurality of predefined event subscription rules;

in response to determining to forward the detected system and facility event to the event subscriber based on the one or more event subscription rules associated with the event subscriber, forwarding the detected system and facility event to the event subscriber;

receiving feedback from the event subscriber regarding the system and facility event forwarded to the event subscriber;

updating the one or more event subscription rules associated with the event subscriber based on the received feedback; and determining whether to forward a subsequent system and facility event to the event subscriber based on the updated one or more event subscription rules associated with the event subscriber.

8. The computer program product according to claim 7, wherein determining whether to forward the detected system and facility event to the event subscriber based on the context of the system and facility operation and the plurality of predefined event subscription rules comprises:

determining whether the system and facility operation is a user-initiated system and facility operation based on the context of the system and facility operation;

if the system and facility operation is a user-initiated system and facility operation, determining whether the event subscriber plays a role in the detected system and facility operation based on the context of the system and facility operation; and if the event subscriber does not play a role in the detected system and facility operation, electing not to forward the detected system and facility event to the event subscriber.

9. The computer program product according to claim 8, wherein the operations further comprise:

if the event subscriber plays a role in the detected system and facility operation, electing to forward the detected system and facility event to the event subscriber.

10. The computer program product according to claim 9, wherein the operations further comprise:

electing to forward one or more additional system and facility events associated with the system and facility operation to the event subscriber, wherein the system and facility operation includes a sequence of associated system and facility events.

11. The computer program product according to claim 8, wherein the operations further comprise:

if it is determined that the system and facility operation is not a user-initiated system and facility operation, determining whether to forward the detected system and facility event to the event subscriber based on one or more event subscription rules associated with the event subscriber.

12. The computer program product according to claim 7, wherein updating the one or more event subscription rules associated with the event subscriber based on the received feedback comprises:

if the received feedback is positive, updating the one or more event subscription rules associated with the event subscriber by electing to forward a subsequent system and facility event similar to the detected system and facility event to the event subscriber; and if the received feedback is negative, updating the one or more event subscription rules associated with the event subscriber by electing not to forward a subsequent system and facility event similar to the detected system and facility event to the event subscriber.

13. A system, comprising:

a processor, a non-volatile memory, containing computer program instructions that are configured to be executed by the processor to perform operations comprising:

receiving a plurality of predefined event subscription rules associated with one or more event subscribers;

detecting a system and facility event associated with a system and facility operation of a computing system;

determining context of the system and facility operation associated with the detected system and facility event;

determining whether to forward the detected system and facility event to an event subscriber from the one or more event subscribers based on the context of the system and facility operation and the plurality of predefined event subscription rules;

in response to determining to forward the detected system and facility event to the event subscriber based on the one or more event subscription rules associated with the event subscriber, forwarding the detected system and facility event to the event subscriber;

receiving feedback from the event subscriber regarding the system and facility event forwarded to the event subscriber;

updating the one or more event subscription rules associated with the event subscriber based on the received feedback; and determining whether to forward a subsequent system and facility event to the event subscriber based on the updated one or more event subscription rules associated with the event subscriber.

14. The system according to claim 13, wherein determining whether to forward the detected system and facility event to the event subscriber based on the context of the system and facility operation and the plurality of predefined event subscription rules comprises:

determining whether the system and facility operation is a user-initiated system and facility operation based on the context of the system and facility operation;

if the system and facility operation is a user-initiated system and facility operation, determining whether the event subscriber plays a role in the detected system and facility operation based on the context of the system and facility operation; and if the event subscriber does not play a role in the detected system and facility operation, electing not to forward the detected system and facility event to the event subscriber.

15. The system according to claim 14, wherein the operations further comprise:

if the event subscriber plays a role in the detected system and facility operation, electing to forward the detected system and facility event to the event subscriber.

16. The system according to claim 14, wherein the operations further comprise:

if it is determined that the system and facility operation is not a user-initiated system and facility operation, determining whether to forward the detected system and facility event to the event subscriber based on one or more event subscription rules associated with the event subscriber.

* * * * *